(No Model.)

J. F. AKIN.
PLOW.

No. 453,688.   Patented June 9, 1891.

Witnesses
Chas. Williamson
A. L. Hough

Inventor
John F. Akin
by Franklin H. Hough
his Attorney

UNITED STATES PATENT OFFICE.

JOHN FRANKLIN AKIN, OF BATH SPRINGS, TENNESSEE.

PLOW.

SPECIFICATION forming part of Letters Patent No. 453,688, dated June 9, 1891.

Application filed February 24, 1891. Serial No. 382,514. (No model.)

*To all whom it may concern:*

Be it known that I, JOHN FRANKLIN AKIN, a citizen of the United States, residing at Bath Springs, in the county of Decatur and State of Tennessee, have invented certain new and useful Improvements in Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in plows, and it relates more particularly to that class of plows which are adapted especially for use in cultivating cotton; and the invention has for its object to generally improve upon the construction of plows in which either single or double adjustable mold-boards are used.

The invention has for its more immediate object to provide a plow of the character described, in which the plow is attached directly to the lower end of the plow-stock, and mold-boards of a peculiar construction, which will be more particularly hereinafter described, are adjustably attached to the side faces of the plow-stock immediately above the upper edges of the plow, the form and adjustable features of the said mold-boards being such as to so regulate the turning of the furrow as to permit the plow to pass close to the row of growing plants without endangering the plants, either by contact with the plow or by covering them with earth.

To the above ends, and to such others as the invention may pertain, the same consists in the peculiar construction and in the novel combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating like parts throughout both views, and in which drawings—

Figure 1:
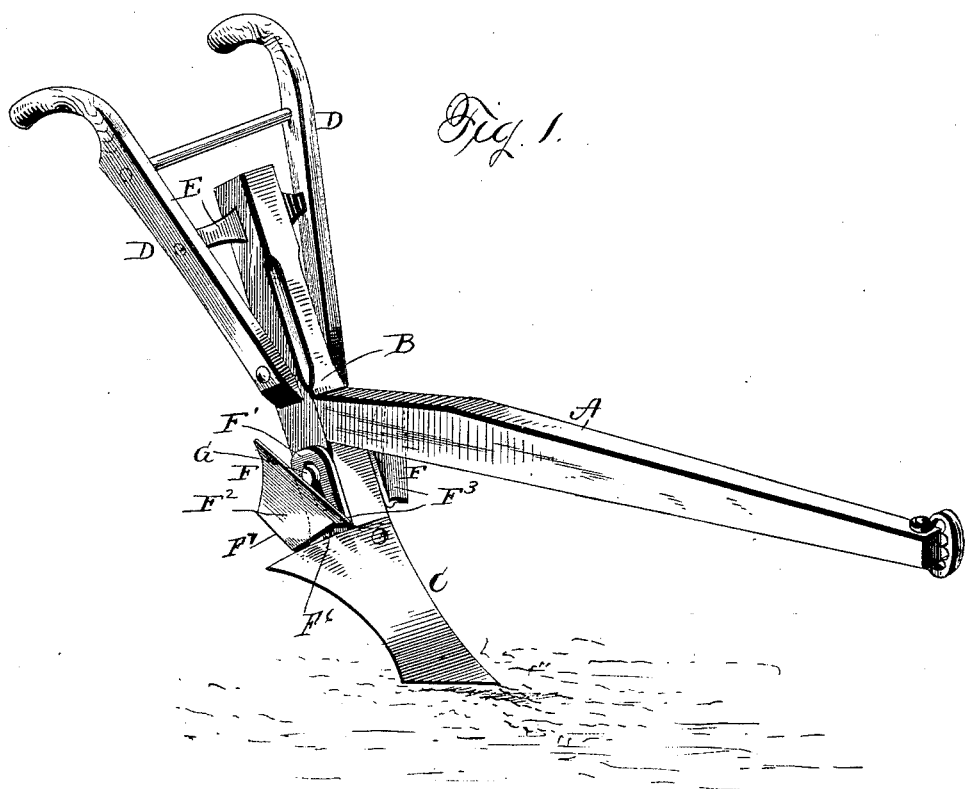
Figure 2:
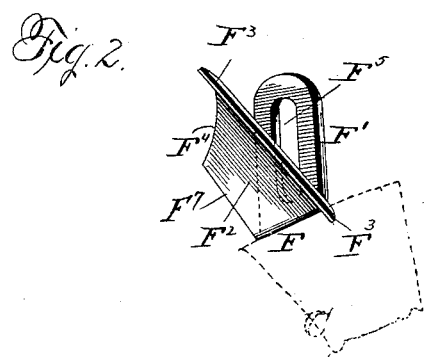

Figure 1 is a perspective view of a plow embodying my improvements. Fig. 2 is a like view of one of the adjustable mold-boards with relative position of the plow shown in dotted lines.

Reference now being had to the details of the drawings by letter, A represents the plow-beam, which is secured at its rear end to the stock B. The said plow-stock B, it will be observed, is inclined at an angle of about forty-five degrees, and its lower end extends for a considerable distance below the plow-beam and has secured thereto the plow C. The handle-bars D D are attached to the plow-stock in the usual manner, and are additionally strengthened by the cross-timber E, which is passed through the upper portion of the stock and has its ends mortised into the handle-bars, as shown.

Particular attention is called to the construction and arrangement of the mold-boards F F, one of which I have shown upon an enlarged scale in Fig. 2 of the drawings, and upon reference to said figure it will be observed that the said mold-board consists of a longitudinally-slotted body portion $F'$ and the mold-board proper $F^2$, said portion $F^2$ being integral with the portion $F'$ and formed by bending the metal back at an acute angle. The upper edge $F^3$ of the mold-board is bent outwardly, as shown, and at its rear edge it is cut away, as shown at $F^4$, said rear edge being at an angle of forty-five degrees from the line drawn along the upper edge of the mold-board. The upper edge $F^3$ of the mold-board is longer than the lower parallel edge $F^7$, as shown in both views of the drawings, so that the curved overturned upper edge serves to effectually prevent the earth from falling over the upper edge into the slot $F^5$ and clogging up the same. The bend in the mold-board is at such an angle as to fit against and correspond with the upper edge of the plow when the mold-board is in the position in which it is usually employed—viz., that shown in Fig. 2. It is also formed with a bend $F^6$ near the forward edge of the portion $F'$, as seen in Fig. 1, so that the forward point of the upper edge will extend farther over the plow. In use either one or two of these mold-boards may be used, as circumstances or the nature of the work to be done may require. They are secured in place upon the side faces of the plow-stock by means of set-screws G, passed through the slots F⁵ of the portion F', and may be readily adjusted in either desired position by loosening said screws, and again secured in place by tightening the screws after proper adjustment has been secured.

By the construction which I have shown of the mold-boards the same may not only be readily adjusted in the direction of the slot F⁵, but they may also be given a rotary adjustment (within certain limits,) so as to turn the furrow, as may be required, in order to protect the growing plants in the row. The front end of the curved upper edge F³ of the mold-board, it will be observed, overlaps the upper edge of the plow, thus serving to prevent any of the earth which passes over the face of the plow from falling before reaching the inclined guiding-face of the mold-board.

Having thus described my invention, what I claim to be new, and desire to secure by Letters Patent, is—

The herein described adjustable mold-board for plows, the same consisting of the longitudinally-slotted portion F', the portion F², bent at an acute angle to the portion F' and forming the mold-board proper, the upper edge of said portion F² being bent outwardly and being longer than its lower edge, and at the forward lower edge of the portion F' bent as at F⁶ and its rear edge F⁴ formed at an angle of substantially forty-five degrees from the upper edge of the mold-board, substantially as described, and for the purpose specified.

In testimony whereof I affix my signature in presence of two witnesses.

JOHN FRANKLIN AKIN.

Witnesses:
HENRY MARTIN,
THOMAS BELL.